United States Patent
Kim

(10) Patent No.: US 10,252,641 B2
(45) Date of Patent: Apr. 9, 2019

(54) ELECTRONIC SEAT SWITCH FOR POWER SEAT OF AUTONOMOUS VEHICLE AND METHOD OF OPERATING POWER SEAT USING ELECTRONIC SEAT SWITCH

(71) Applicant: Hyundai Motor Company, Seoul (KR)

(72) Inventor: Eun Sue Kim, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 219 days.

(21) Appl. No.: 15/363,151

(22) Filed: Nov. 29, 2016

(65) Prior Publication Data

US 2018/0056816 A1 Mar. 1, 2018

(30) Foreign Application Priority Data

Aug. 24, 2016 (KR) .................. 10-2016-0107993

(51) Int. Cl.
*B60N 2/02* (2006.01)
*G06F 3/044* (2006.01)
*B60R 16/037* (2006.01)

(52) U.S. Cl.
CPC .......... *B60N 2/0228* (2013.01); *B60R 16/037* (2013.01); *G06F 3/044* (2013.01); *G06F 2203/04105* (2013.01)

(58) Field of Classification Search
CPC ...... B60N 2/0228; B60R 16/037; G06F 3/044
USPC .......................................................... 701/49
See application file for complete search history.

(56) References Cited

U.S. PATENT DOCUMENTS

| | | | |
|---|---|---|---|
| 2015/0137564 A1* | 5/2015 | Cuddihy | B60N 2/203 297/94 |
| 2015/0142245 A1* | 5/2015 | Cuddihy | B60N 2/143 701/23 |
| 2015/0142246 A1* | 5/2015 | Cuddihy | B62D 1/183 701/23 |
| 2015/0142273 A1* | 5/2015 | Cuddihy | B60N 2/005 701/49 |
| 2016/0082867 A1* | 3/2016 | Sugioka | B60N 2/919 701/49 |
| 2016/0082976 A1* | 3/2016 | Sugioka | B60W 50/0098 701/23 |
| 2016/0264021 A1* | 9/2016 | Gillett | B60K 1/04 |
| 2017/0028876 A1* | 2/2017 | Yamada | B60N 2/012 |
| 2017/0028987 A1* | 2/2017 | Yamada | B60W 50/08 |
| 2017/0050538 A1* | 2/2017 | Akimoto | B60N 2/0244 |
| 2017/0101032 A1* | 4/2017 | Sugioka | B60N 2/763 |
| 2017/0313208 A1* | 11/2017 | Lindsay | B60N 2/0244 |
| 2018/0154899 A1* | 6/2018 | Tiwari | G08G 1/0112 |
| 2018/0178808 A1* | 6/2018 | Zhao | B60W 40/08 |
| 2018/0222490 A1* | 8/2018 | Ishihara | B60W 50/14 |

(Continued)

FOREIGN PATENT DOCUMENTS

| | | |
|---|---|---|
| JP | 2014-169048 | 9/2014 |
| JP | 5967309 | 8/2016 |
| KR | 2010-0062230 A | 6/2010 |

(Continued)

*Primary Examiner* — Krishnan Ramesh
(74) *Attorney, Agent, or Firm* — Morgan, Lewis & Bockius LLP

(57) ABSTRACT

Disclosed is an electronic seat switch for a power seat of an autonomous vehicle and a method of operating the power seat by using the electronic seat switch, wherein the power seat is configured to be operated by using the electronic seat switch that is compact and slim.

11 Claims, 4 Drawing Sheets

(56) References Cited

U.S. PATENT DOCUMENTS

2018/0244174 A1* 8/2018 Tan ..................... B60N 2/0244

FOREIGN PATENT DOCUMENTS

| KR | 10-2015-0074873 | 7/2015 |
| KR | 10-1619619 | 5/2016 |
| WO | WO2015011866 | 1/2015 |

* cited by examiner

ELECTRONIC SEAT SWITCH FOR POWER SEAT OF AUTONOMOUS VEHICLE AND METHOD OF OPERATING POWER SEAT USING ELECTRONIC SEAT SWITCH

CROSS REFERENCE TO RELATED APPLICATION

The present application claims priority to Korean Patent Application No. 10-2016-0107993, filed Aug. 24, 2016, the entire contents of which is incorporated herein for all purposes by this reference.

BACKGROUND OF THE INVENTION

Field of the Invention

The present invention relates generally to an electronic seat switch for a power seat of an autonomous vehicle and a method of operating the power seat using the electronic seat switch.

Description of Related Art

Generally, an autonomous vehicle is a vehicle that is capable of driving to a destination by itself without a steering wheel, an accelerator, a break, etc. being controlled by a driver. A smart vehicle using autonomous driving technology that is applied to aircrafts, vessels, etc. is called an autonomous vehicle.

In order to perform autonomous driving of the vehicle, besides vehicle technology, it is required to use various advanced technologies such as technologies of communications between the vehicle and a base station, and between the vehicle and an artificial satellite, etc. Such technologies may include, for example: a highway driving assist (HDA) technology for automatically maintaining the distance between vehicles, a lane departure warning system (LDWS), a lane keeping assist system (LKAS), a blind spot detection (BSD) system, an advanced smart cruise control (ASCC) system, an autonomous emergency braking (AEB) system, etc.

In the meantime, in an autonomous driving mode, it is required to quickly adjust a car seat to various positions for passenger comfort. To this end, a power seat automatically operated by using power of a motor is suitable than a mechanical seat. In addition, as a seat switch for controlling operation of the power seat, an electronic switch using an electronic sensor is better than a mechanical switch that is in contact with an electrode by using a mechanical knob.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an electronic seat switch for a power seat of an autonomous vehicle and a method of operating the power seat using the electronic seat switch, the electronic seat switch reducing space occupancy by being compact and slim, and having a low failure rate in comparison with a mechanical switch.

In an aspect of the present invention, there is provided an electronic seat switch for a power seat of an autonomous vehicle, the electronic seat switch including: a manual driving mode seat switch adjusting a seat position in a manual driving mode; and an autonomous driving mode seat switch adjusting the seat position in an autonomous driving mode, wherein the manual driving mode seat switch is configured to be operated by movement of a user's finger moving on a sensor while the user's finger touches the sensor.

The manual driving mode seat switch may include: a seat cushion switch adjusting a seat cushion position; a seat back switch adjusting a seat back position; and a headrest switch adjusting a headrest position, wherein the seat cushion switch, the seat back switch, and the headrest switch are separately provided.

The manual driving mode seat switch may include: a plurality of sensors detecting pressure information and capacitive information caused by the touch of the user's finger; and a printed circuit board (PCB) controlling power supplied to the plurality of sensors, and transmitting the pressure information and the capacitive information detected by the plurality of sensors to a seat controller, wherein the plurality of sensors are arranged in a row while being spaced apart at predetermined intervals.

The autonomous driving mode seat switch may include: one sensor detecting pressure information and capacitive information caused by the touch of the user's finger; and a PCB controlling power supplied to the sensor, and transmitting the pressure information and the capacitive information detected by the sensor to a seat controller, wherein whenever the user's finger touches the sensor, a seat comfort mode is changed.

The electronic seat switch may include an emergency return seat switch immediately returning the seat position to a memorized driving position mode in the autonomous driving mode, wherein the emergency return seat switch is directly controlled by the touch of the user's finger or automatically controlled by a seat controller.

In addition, according to another aspect, there is provided a method of operating a power seat of an autonomous vehicle by using the electronic seat switch of the present invention, the method including: determining, by a vehicle controller at a driving mode determining step, whether the vehicle is in the manual driving mode or in the autonomous driving mode; determining, by the seat controller at a signal generation first determining step, whether or not the manual driving mode seat switch generates an input signal, when determining the vehicle is in the manual driving mode at the driving mode determining step; and adjusting, by the seat controller at a seat adjusting step, the seat position based on the touch of the user's finger, when determining the manual driving mode seat switch generates the input signal at the signal generation first determining step.

The method may include determining, by the vehicle controller at a driving determining step, whether or not the vehicle is being driven between the signal generation first determining step and the seat adjusting step, wherein when determining the vehicle is not driven after generating the input signal of the manual driving mode seat switch, the seat controller immediately performs the seat adjusting step.

The method may include: generating, by the vehicle controller at a first alarm generating step, a first alarm by using an audio output device, when determining the vehicle is being driven at the driving determining step; and determining, by the seat controller at a signal generation second determining step, whether or not the manual driving mode seat switch further generates the input signal within a predetermined time period after generating the first alarm, wherein when determining the input signal is further generated at the signal generation second determining step, a second alarm is generated and the seat adjusting step is performed thereafter.

Each of switches of the manual driving mode seat switch may include a plurality of sensors arranged in a row. One of the plurality of sensors arranged in the row may be determined by the seat controller as a reference sensor by being touched with the user's finger first. A reference value may be determined by quantifying input information of the user's finger detected by the reference sensor. When additional input information is generated at each of adjacent sensors located at left and right sides of the reference sensor within a predetermined time period after generating the input information of the reference sensor, a plurality of comparative values may be determined by quantifying the additional input information of each of the adjacent sensors. The seat controller may determine that the user's finger moves to a sensor having a comparative value which is equal to or greater than a preset proportion of the reference value among the plurality of comparative values, and may control a seat actuator to adjust the seat position based on movement of the user's finger.

When the additional input information is not generated at each of the adjacent sensors located at the left and right sides of the reference sensor within the predetermined time period after generating the input information of the reference sensor, the vehicle controller may control the seat actuator to maintain the seat position.

In addition, according to still another aspect, there is provided a method of operating a power seat of an autonomous vehicle by using the electronic seat switch of the present invention, the method including: determining, by a vehicle controller at a driving mode determining step, whether the vehicle is in the manual driving mode or in the autonomous driving mode; determining, by the seat controller at a signal generation third determining step, whether or not the autonomous driving mode seat switch generates an input signal, when determining the vehicle is in the autonomous driving mode at the driving mode determining step; and adjusting, by the seat controller at a seat adjusting step, the seat position based on the touch of the user's finger, when determining the autonomous driving mode seat switch generates the input signal at the signal generation third determining step.

The method may include determining, by the vehicle controller at an emergency determining step, whether or not an emergency has happened in the autonomous driving mode before performing the signal generation third determining step, wherein only when determining an emergency has not happened at the emergency determining step, the signal generation third determining step is performed.

When determining an emergency has happened at the emergency determining step, the seat controller may operate an emergency return seat switch. When the emergency return seat switch is operated, the seat position may be automatically returned to a memorized driving position mode.

The exemplary embodiments of the present invention relate to the electronic seat switch for the power seat of an autonomous vehicle and the method of operating the power seat by using the electronic seat switch that is compact and slim. With the electronic seat switch, space occupancy is reduced, and particularly, failure rate is reduced in comparison with a mechanical switch, thereby enhancing the value of the electronic seat switch.

In addition, according to the exemplary embodiments of the present invention, by using the electronic seat switch that is compact and slim, it is possible to provide the electronic seat switch at various positions where the user can easily touch.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
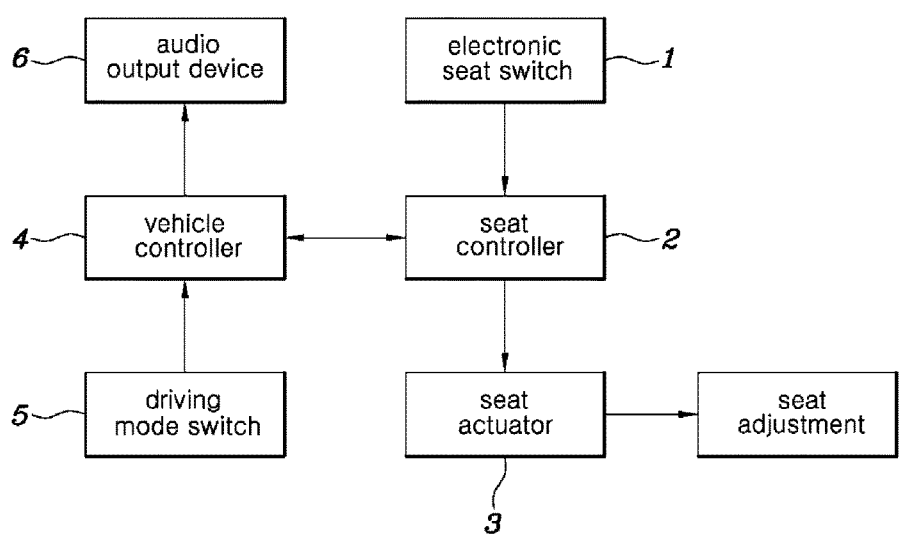
FIG. 1 is a block diagram for explaining exemplary embodiments of the present invention.
Figure 2:
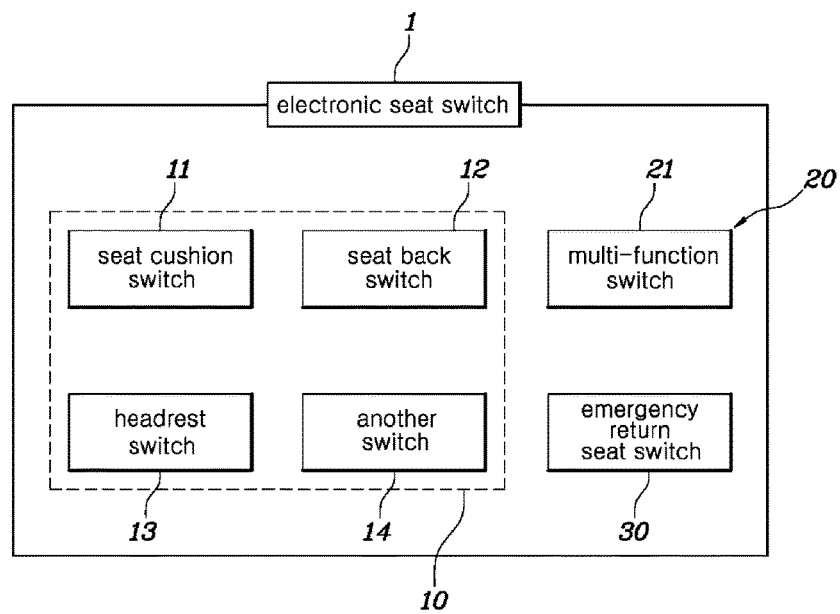
FIG. 2 is a structure diagram showing an electronic seat switch according to the exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of an electronic seat switch for a power seat of an autonomous vehicle and a method of operating the power seat using the electronic seat switch will be described in detail with reference to the accompanying drawings.

According to the exemplary embodiments of the present invention, an electronic seat switch 1 is an electronic switch for a touch pad operated by a touch of a user. An operating signal of the electronic seat switch 1 is inputted to a seat controller 2. The seat controller 2 controls a seat actuator 3 by using the operating signal transmitted from the electronic seat switch 1. The seat actuator 3 adjusts a seat position of the vehicle seat to a user-desired seat position.

The seat controller 2 transmits a signal to or receives a signal from the vehicle controller 4 through a communication system or a wire. The vehicle controller 4 determines whether the vehicle is in a manual driving mode or in an autonomous driving mode by receiving an operating signal of a driving mode switch 5. The vehicle controller transmits a result of the determination to the seat controller 2. The seat controller 2 controls the seat actuator 3 based on the result of the determination, when the electronic seat switch 1 is operated.

In addition, the vehicle controller 4 determines whether or not the vehicle is being driven, and transmits a result of the determination to the seat controller 2. The seat controller 2 controls the seat actuator 3 based on the result of the determination, when the electronic seat switch 1 is operated.

In addition, when the electronic seat switch 1 is operated, the seat controller 2 transmits a signal to the vehicle controller 4 based on the result of the determination received from the vehicle controller 4. Therefore, the vehicle controller 4 may control an audio output device 6.

The electronic seat switch 1 includes a manual driving mode seat switch 10, an autonomous driving mode seat switch 20, and emergency return seat switch 30.

The manual driving mode seat switch 10 includes a seat cushion switch 11, a seat back switch 12, a headrest switch 13, and another switch 14.

The seat cushion switch 11 may include a tilting switch for adjusting an inclination of front and rear ends of a seat cushion, a height switch for adjusting a height of the seat cushion, an extension switch for adjusting a length of the seat cushion in forward and backward directions, etc.

The seat back switch 12 may include a reclining switch for adjusting an inclination of a seat back in forward and backward directions, a folding switch for folding the seat back, etc.

The headrest switch 13 may include functions adjusting a height of a headrest, an inclination of the headrest in forward and backward directions, and a protruding length of the headrest.

The another switch 14 may include a lumbar switch, a massage switch, etc.

It is required to separately provide the switches of the manual driving mode seat switch 10, without being limited thereto.

The autonomous driving mode seat switch 20 is a multi-function switch 21 providing comfort to a user in various seat positions during the autonomous driving mode. The multi-function switch may provide a rest mode, a sleep mode, a reading mode, a massage mode, etc. The seat position varies depending on the mode.

When the vehicle controller 4 determines an emergency wherein an accident may happen in the autonomous driving mode, the emergency return seat switch 30 transmits a signal to the seat controller 2 based on the determination. The seat controller 2 operates the seat actuator 3 by receiving the signal of the vehicle controller 4. Consequently, the seat position of the vehicle seat is automatically immediately returned to a memorized driving position mode, thereby adjusting the position of the user to a safe state.

The switches of the manual driving mode seat switch 10 are operated by movement of the user's finger touching and moving on a sensor. Each of the switches of the manual driving mode seat switch includes a plurality of sensors 111 detecting input information (pressure information and capacitive information) caused by the touch of the user's finger; and a PCB 112 controlling power supplied to the plurality of sensors 111, and transmitting the input information detected by the plurality of sensors 111 to the seat controller 2. The plurality of sensors 111 are arranged in a row while being spaced apart at predetermined intervals.

Among the plurality of sensors 111 arranged in a row, the seat controller 2 determines one sensor as a reference sensor touched with the user's finger first. A reference value is determined by quantifying the input information (pressure information and capacitive information) detected by the reference sensor. When additional input information is generated at each of adjacent sensors located at predetermined sides of the reference sensor within a predetermined time period after generating the input information of the reference sensor, a plurality of comparative values are determined by quantifying the additional input information of each of the adjacent sensors. The seat controller 2 determines that the user's finger moves to a sensor having a comparative value which is equal to or greater than a preset proportion of the reference value among the plurality of comparative values, and controls a seat actuator 3 to adjust the seat position based on a movement of the user's finger.

Figure 3:
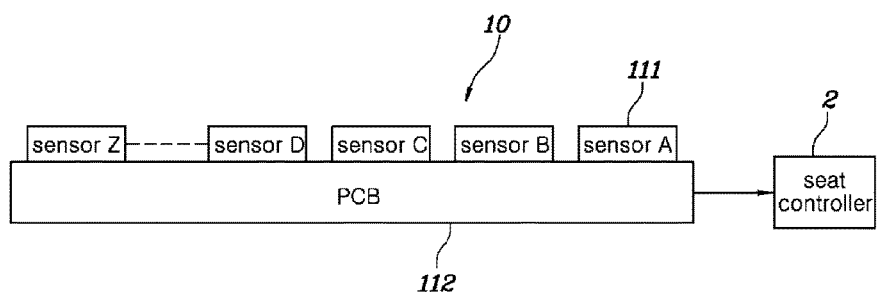
FIG. 3 and FIG. 4 are structure diagrams showing a manual driving mode seat switch and an autonomous driving mode seat switch according to the exemplary embodiments of the present invention.
Figure 4:
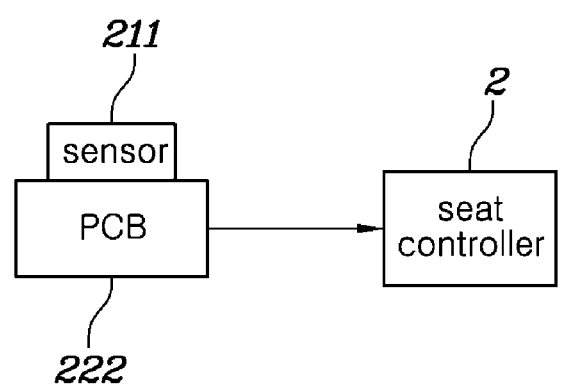

For example, referring to FIG. 3, when the user's finger touches a sensor A first, the seat controller 2 determines the sensor A as a reference sensor. Here, input information (pressure information and capacitive information) of the reference sensor is detected by using the PCB 112. The input information of the reference sensor is transmitted to the seat controller 2. The seat controller 2 determines a reference value by quantifying the input information of the reference sensor.

When the user's finger touching the sensor A moves to a sensor Z within a predetermined time period after generating the input information of the sensor A, additional input information (pressure information and capacitive information) is generated at each of a sensor B, a sensor C, etc. located at a left side of the sensor A. In the same manner as the reference value, a plurality of comparative values are determined by quantifying the additional input information of each of sensors located at the left side of the sensor A.

In the meantime, when the user's finger touching the sensor A moves to the sensor Z after the predetermined time period from a time when the input information of the sensor A is generated, the additional input information of the sensor B is determined as a new reference value. Here, the seat controller 2 controls the seat actuator 3 to maintain the seat position.

After determining one reference value and a plurality of comparative values based on the movement of the user's finger, the seat controller 2 determines that the user's finger moves to a sensor having a comparative value which is equal to or greater than a preset proportion of the reference value among the plurality of comparative values. At the same time, the seat controller controls the seat actuator 3 to adjust the seat position based on the movement of the user's finger.

That is, when the reference value of the sensor A touched by the user's finger first is set as 100%, based on the movement of the user's finger, a comparative value of the sensor B is 80%, a comparative value of the sensor C is 70%, and a comparative value of the sensor D is 50%.

Here, when a limit value is memorized at the comparative value of 70% relative to the reference value of 100%, the seat controller 2 determines that the user's finger moves to the sensor C, and controls the seat actuator 3. Consequently, the seat position is adjusted based on the movement of the user's finger to the sensor C.

The limit value memorized in the seat controller 2 is a tuning value that is adjustable by the user. The seat position is adjusted based on a selected one of the switches of the manual driving mode seat switch 10 by the user. For example, when the reclining switch is operated, an inclination of the seat back is adjusted in forward and backward directions based on the movement of the user's finger to the sensor C, thereby adjusting the seat position.

The autonomous driving mode seat switch 20, namely, the multi-function switch 21 includes one sensor 211 detecting input information (pressure information and capacitive information) caused by the touch of the user's finger; and a PCB 212 controlling power supplied to the sensor 211, and transmitting the input information detected by the sensor 211 to the seat controller 2. Whenever the user's finger touches the sensor 211, a seat comfort mode is changed.

That is, when the user touches the sensor 211 once at the beginning, the rest mode is selected. When the user touches the sensor again, the sleep mode, the reading mode, etc. are selected in sequence. After selecting one of the modes, it is required to touch the sensor differently to operate and terminate the selected mode.

The electronic seat switch 1 may be selectively provided on a seat, a console, a dashboard, a door, etc. that the user can easily touch. Alternatively, a plurality of electronic seat switches may be provided at various positions.

Figure 5:
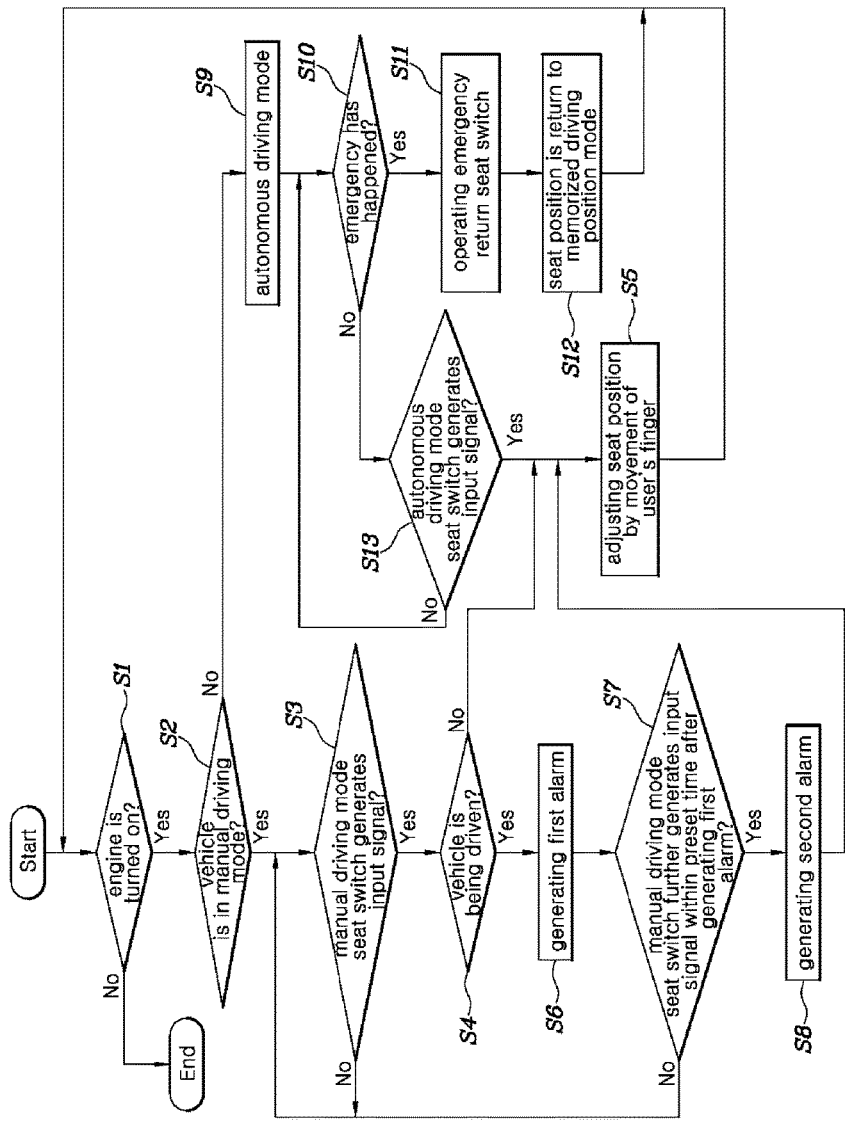
FIG. 5 is a flowchart for explaining the exemplary embodiments of the present invention.

Hereinafter, the operation of the exemplary embodiments of the present invention will be described with reference to FIG. 5.

The vehicle controller 4 determines whether or not an engine of the vehicle is turned on at step S1. When operating the driving mode switch 5 in the case of the engine turned on, the vehicle controller 4 determines whether the vehicle is in the manual driving mode or in the autonomous driving mode at step S2.

When the user operates the manual driving mode seat switch 10 after determining the vehicle is in the manual driving mode at step S2, the seat controller 2 determines whether or not the manual driving mode seat switch 10 generates an input signal at step S3. Next, the vehicle controller 4 determines whether or not the vehicle is being driven at step S4.

When determining the manual driving mode seat switch 10 does not generate the input signal at step S3, step S3 is repeatedly performed.

When determining the manual driving mode seat switch 10 generates the input signal at step S3, and determining the vehicle is not being driven at step S4, the seat controller 2 operates the seat actuator 3. Therefore, the seat position is immediately adjusted by the user operating the manual driving mode seat switch 10 at step S5.

When determining the manual driving mode seat switch 10 generates the input signal at step S3, and determining the vehicle is being driven at step S4, the seat controller 2 controls the seat actuator 3 not to be for a predetermined time operated, the seat position is for a predetermined time maintained. Here, the seat controller 2 transmits a signal to the vehicle controller 4. The vehicle controller 4 controls the audio output device 6 to generate a first alarm by using the signal received from the seat controller 2 at step S6.

In addition, within a predetermined time period after generating the first alarm, the seat controller 2 determines whether or not the manual driving mode seat switch 10 further generates the input signal at step S7. When determining the input signal is further generated at step S7, in the same manner as the first alarm, a second alarm is generated at step S8. After few seconds, the seat position is adjusted by the user operating the manual driving mode seat switch 10 at step S5.

In the meantime, when determining the vehicle is in the autonomous driving mode at step S2, the vehicle is in the autonomous driving mode at step S9. The vehicle controller 4 determines whether or not a circumstance is an emergency wherein an accident may happen by considering adjacent vehicles, road conditions, and any other surrounding conditions in the autonomous driving mode at step S10. When determining an emergency has happened at step S10, a signal is transmitted to the seat controller 2 based on the determination. The seat controller 2 automatically operates the emergency return seat switch 30 by receiving the signal of the vehicle controller 4 at step S11. Consequently, the seat actuator 3 is operated by the emergency return seat switch 30, thereby the seat position is automatically immediately returned to the memorized driving position mode at step S12. As a result, the position of the user is immediately adjusted to a safe state.

In addition, when determining an emergency has not happened at step S10, and operating the autonomous driving mode seat switch 20 by the user thereafter, the seat controller 2 determines whether or not the autonomous driving mode seat switch 20 generates an input signal at step S13. When determining the input signal is generated at step S13, the seat controller 2 operates the seat actuator 3. Consequently, the seat position is immediately adjusted by the user operating the autonomous driving mode seat switch 20 at step S5.

When determining the autonomous driving mode seat switch 20 does not generate the input signal at step S13, step S10 is repeatedly performed.

As described above, the exemplary embodiments of various embodiments of the present invention relates to the electronic seat switch for a power seat of the autonomous vehicle and the method of operating the power seat by using the electronic seat switch 1 that is compact and slim. With the electronic seat switch 1, space occupancy is configured to be reduced, and, failure rate is reduced in comparison with a mechanical switch, enhancing the value of the electronic seat switch.

In addition, according to the exemplary embodiments of the present invention, by using the electronic seat switch 1 that is compact and slim, it is possible to provide the electronic seat switch at various positions where the user can easily touch.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic seat switch apparatus for a power seat of a vehicle, the electronic seat switch apparatus comprising:
    a manual driving mode seat switch configured for adjusting a seat position in a manual driving mode; and
    an autonomous driving mode seat switch configured for adjusting the seat position in an autonomous driving mode,
    wherein the manual driving mode seat switch is configured to be operated by movement of a user's finger moving on a sensor while the user's finger touches the sensor,
    wherein the manual driving mode seat switch includes:

a plurality of sensors detecting pressure information and capacitive information caused by a touch of the user's finger; and a printed circuit board (PCB) controlling power supplied to the plurality of sensors, and transmitting the pressure information and the capacitive information detected by the plurality of sensors to a seat controller, wherein the plurality of sensors are arranged in a row while being spaced apart at predetermined intervals, wherein one of the plurality of sensors arranged in the row is determined by the seat controller as a reference sensor by being touched with the user's finger first, wherein a reference value is determined by quantifying input information of the user's finger detected by the reference sensor, wherein, when additional input information is generated at each of adjacent sensors located at predetermined sides of the reference sensor within a predetermined time period after generating the input information of the reference sensor, a plurality of comparative values are determined by quantifying the additional input information of the each of the adjacent sensors, and wherein the seat controller determines that the user's finger moves to a sensor having a comparative value which is equal to or greater than a preset proportion of the reference value among the plurality of comparative values, and controls a seat actuator to adjust the seat position based on movement of the user's finger.

2. The electronic seat switch apparatus of claim 1, wherein the manual driving mode seat switch includes:
a seat cushion switch configured for adjusting a seat cushion position;
a seat back switch configured for adjusting a seat back position; and
a headrest switch configured for adjusting a headrest position,
wherein the seat cushion switch, the seat back switch, and the headrest switch are separately provided.

3. The electronic seat switch apparatus of claim 1, wherein the autonomous driving mode seat switch includes:
one sensor detecting the pressure information and the capacitive information caused by the touch of the user's finger; and
the printed circuit board (PCB) controlling power supplied to the one sensor, and transmitting the pressure information and the capacitive information detected by the one sensor to the seat controller,
wherein whenever the user's finger touches the one sensor, a seat comfort mode is changed.

4. The electronic seat switch apparatus of claim 1, further including:
an emergency return seat switch configured returning the seat position to a memorized driving position mode in the autonomous driving mode,
wherein the emergency return seat switch is directly controlled by the touch of the user's finger or automatically controlled by the seat controller.

5. A method of operating a power seat of a vehicle by using an electronic seat switch apparatus for a power seat of the vehicle, the electronic seat switch apparatus comprising:
a manual driving mode seat switch configured for adjusting a seat position in a manual driving mode; and
an autonomous driving mode seat switch configured for adjusting the seat position in an autonomous driving mode, wherein the manual driving mode seat switch is configured to be operated by movement of a user's finger moving on a sensor while the user's finger touches the sensor, the method including:
determining, by a vehicle controller at a driving mode determining step, whether the vehicle is in the manual driving mode or in the autonomous driving mode;
determining, by a seat controller at a signal generation first determining step, whether or not the manual driving mode seat switch generates an input signal, when determining the vehicle is in the manual driving mode at the driving mode determining step; and
adjusting, by the seat controller at a seat adjusting step, the seat position based on a touch of the user's finger, when determining the manual driving mode seat switch generates the input signal at the signal generation first determining step, wherein each of switches of the manual driving mode seat switch includes a plurality of sensors arranged in a row, wherein one of the plurality of sensors arranged in the row is determined by the seat controller as a reference sensor by being touched with the user's finger first, wherein a reference value is determined by quantifying input information of the user's finger detected by the reference sensor, wherein when additional input information is generated at each of adjacent sensors located at predetermined sides of the reference sensor within a predetermined time period after generating the input information of the reference sensor, a plurality of comparative values are determined by quantifying the additional input information of the each of the adjacent sensors, and wherein the seat controller determines that the user's finger moves to a sensor having a comparative value which is equal to or greater than a preset proportion of the reference value among the plurality of comparative values, and controls a seat actuator to adjust the seat position based on movement of the user's finger.

6. The method of claim 5, further including:
determining, by the vehicle controller at a driving determining step, whether or not the vehicle is being driven between the signal generation first determining step and the seat adjusting step,
wherein when determining the vehicle is not driven after generating the input signal of the manual driving mode seat switch, the seat controller performs the seat adjusting step.

7. The method of claim 6, further including:
generating, by the vehicle controller at a first alarm generating step, a first alarm by using an audio output device, when determining the vehicle is being driven at the driving determining step; and
determining, by the seat controller at a signal generation second determining step, whether or not the manual driving mode seat switch further generates the input signal within a predetermined time period after generating the first alarm,
wherein when determining the input signal is further generated at the signal generation second determining step, a second alarm is generated and the seat adjusting step is performed thereafter.

8. The method of claim 5, wherein when the additional input information is not generated at the each of the adjacent sensors located at the predetermined sides of the reference sensor within the predetermined time period after generating the input information of the reference sensor, the vehicle controller controls the seat actuator to maintain the seat position.

9. A method of operating a power seat of a vehicle by using an electronic seat switch apparatus for a power seat of the vehicle, the electronic seat switch apparatus comprising:
- a manual driving mode seat switch configured for adjusting a seat position in a manual driving mode; and
- an autonomous driving mode seat switch configured for adjusting the seat position in an autonomous driving mode,
- wherein the manual driving mode seat switch is configured to be operated by movement of a user's finger moving on a sensor while the user's finger touches the sensor, the method including:
- determining, by a vehicle controller at a driving mode determining step, whether the vehicle is in the manual driving mode or in the autonomous driving mode;
- determining, by a seat controller at a signal generation third determining step, whether or not the autonomous driving mode seat switch generates an input signal, when determining the vehicle is in the autonomous driving mode at the driving mode determining step; and
- adjusting, by the seat controller at a seat adjusting step, the seat position based on a touch of the user's finger, when determining the autonomous driving mode seat switch generates the input signal at the signal generation third determining step, wherein each of switches of the manual driving mode seat switch includes a plurality of sensors arranged in a row, wherein one of the plurality of sensors arranged in the row is determined by the seat controller as a reference sensor by being touched with the user's finger first, wherein a reference value is determined by quantifying input information of the user's finger detected by the reference sensor, wherein when additional input information is generated at each of adjacent sensors located at redetermined sides of the reference sensor within a predetermined time period after generating the input information of the reference sensor, a plurality of comparative values are determined by quantifying the additional input information of the each of the adjacent sensors, and wherein the seat controller determines that the user's finger moves to a sensor having a comparative value which is equal to or greater than a preset proportion of the reference value among the plurality of comparative values, and controls a seat actuator to adjust the seat position based on movement of the user's finger.

10. The method of claim 9, further including:
- determining, by the vehicle controller at an emergency determining step, whether or not an emergency has happened in the autonomous driving mode before performing the signal generation third determining step,
- wherein when determining the emergency has not happened at the emergency determining step, the signal generation third determining step is performed.

11. The method of claim 10, wherein when determining the emergency has happened at the emergency determining step, the seat controller operates an emergency return seat switch, and
when the emergency return seat switch is operated, the seat position is automatically returned to a memorized driving position mode.

* * * * *